United States Patent [19]
Kondo

[11] Patent Number: 5,177,720
[45] Date of Patent: Jan. 5, 1993

[54] OPTICAL DISC RECORDING SYSTEM

[75] Inventor: Tamon Kondo, Hamamatsu, Japan

[73] Assignee: Yamaha Corporation, Hamamatsu, Japan

[21] Appl. No.: 475,740

[22] Filed: Feb. 6, 1990

[30] Foreign Application Priority Data

Feb. 7, 1989 [JP] Japan .................................. 1-27815

[51] Int. Cl.⁵ .............................................. G11B 17/22
[52] U.S. Cl. ........................................ 369/32; 369/48; 360/12.1
[58] Field of Search ............... 369/32, 47, 48, 58, 369/59, 100, 111, 275–279, 54, 124; 360/72.1, 72.2

[56] References Cited

U.S. PATENT DOCUMENTS 4,931,927 6/1990 Ishiwata et al. .................... 369/300
4,996,678 2/1991 Maeda ................................ 369/32

FOREIGN PATENT DOCUMENTS

0281415 7/1988 European Pat. Off. .
0292917 11/1988 European Pat. Off. .

Primary Examiner—Donald McElheny, Jr.
Assistant Examiner—Robert Chevalier
Attorney, Agent, or Firm—Spensley Horn Jubas & Lubitz

[57] ABSTRACT

An optical disc recording system for recording data on a writable type optical disc comprises a data signal forming circuit which causes, when program information is recorded program by program separately and with interruption and table-of-contents (TOC) information is recorded later, information at a part-of-the-way or intermediate position (intermediate information) among position information necessary for producing the TOC information to be recorded, during each interruption, at a position inside of a TOC area on an optical disc and causes this intermediate information to be read out when writing of program information is resumed for later utilization for generation of the TOC information thereby to shorten time required for generation of the TOC information.

8 Claims, 7 Drawing Sheets

OPTICAL DISC RECORDING SYSTEM

BACKGROUND OF THE INVENTION

This invention relates to an optical disc recording system for recording data on a writable type optical disc and, more particularly, to an optical disc recording system of this type in which, when program information is recorded program by program separately and with interruption and table-of-contents (hereinafter sometimes abbreviated as "TOC") information is recorded later, information at a part-of-the-way or intermediate position (intermediate information) among position information necessary for producing the TOC information is recorded during each interruption at a position inside of a TOC area on the optical disc and this intermediate information is read when writing of program information is resumed for later utilization for generation of the TOC information thereby to save time required for collecting position information necessary for generation of the TOC information and thus shorten time required for generation of the TOC information.

Known in the art are writable type optical discs such as a DRAW (additional writing type) disc and an E-DRAW (erasable type) disc. The DRAW disc allows writing for only once and, in this disc, information pits are formed by, for example, burning off a metal recording film by heat generated by irradiation of laser beam. The E-DRAW disc allows rewriting of recorded data and includes one utilizing a magneto-optical recording system and one utilizing a phase change between a crystalline state and an amorphous state.

On these writable type optical discs are provided a program area and a TOC area (corresponding to a lead-in area in a Compact Disc) in the same manner as in a Compact Disc (hereinafter abbreviated as "CD") in a Compact Disc Digital Audio System.

Program information (i.e., data such as music data) is recorded, with position information (i.e., data representing position such as address, time and music number), in the program area of the optical disc. TOC information (corresponding to TOC in a Compact Disc) including, e.g., a program number, start time of each program, total program number and finish time of all programs is recorded in the TOC area. This TOC information is utilized for, e.g., random access.

In recording program information in the prior art writable type optical disc, positions at which each program information starts and ends are measured prior to recording, TOC information is formed on the basis of this data and this TOC information is attached at the head of the program information to produce a series of data and achieve recording at a stretch.

The TOC information cannot be written unless and until all program information to be written on an optical disc has been determined and the table of contents has thus been determined. For this reason, in a case where program information is recorded program by program separately and with interruption, it is not possible, as in the prior art recording system, to generate TOC information previously and attach it at the head of program information to achieve recording at a stretch. In the case of recording program information separately program by program with interruption, therefore, all program information on the disc must be reproduced after all program information has been recorded to obtain position information necessary for generating TOC information and produce TOC information to be recorded in the TOC area on the disc. It therefore takes about 60 minutes, for example, to obtain position information necessary for producing TOC information, if information of a full Compact Disc recording capacity is to be recorded. This results in the disadvantage that recording of TOC information in an optical disc takes unduly long time.

It is, therefore, an object of the invention to overcome the above described problem of the prior art optical disc recording system and provide an optical disc recording system in which, when program information is recorded program by program separately and with interruption and TOC information is recorded later, time for collecting position information necessary for producing TOC information is saved and recording time thereby is shortened.

SUMMARY OF THE INVENTION

An optical disc recording system achieving the above described object of the invention comprises input means for inputting program information to be recorded, position information generation means for generating position information in parallel to inputting of the program information, program information output means for delivering out the program information after imparting the generated position information to the input program information, program information recording control means for recording the output program information in a program area on an optical disc, memory means for obtaining and storing, during recording of the program information, position information necessary for generating table-of-contents information on the basis of the generated position information, intermediate information recording control means for reading out position information, i.e., intermediate information, stored in said memory means during interruption of recording of the program information and recording the intermediate information at a position inside of a table-of-contents area on the disc, intermediate information memory control means for reading out, at resumption of recording of program information, the intermediate information recorded on the disc and storing it in said memory means, table-of-contents information output means for reading out the information stored in said memory means and providing this information as table-of-contents information, and table-of-contents recording control means for recording the output table-of-contents information in the table-of-contents area on the disc.

According to the invention, position information is generated in parallel to inputting of program information and this position information is imparted to the program information which is then stored in a program area on an optical disc. At this time, position information necessary for generating TOC information is obtained on the basis of the generated position information and stored in a memory. This stored information is read out as intermediate information during interruption of recording of the program information, recorded once at a position inside of a TOC area on the disc and is read out from this recorded position on the disc at resumption of recording of program information. In this manner, all position information necessary for generating TOC information is obtained at a time point when writing of all program information has finished so that TOC information is generated on the basis of this position information and recorded in the TOC area on the disc.

Since generation of position information necessary for generating TOC information is made in parallel to recording of program information and intermediate information is once recorded at a position inside of the TOC area on the disc during interruption of recording, a process for collecting position information by once reproducing all program information on the disc is obviated so that time required exclusively for collecting this information becomes unnecessary with resulting shortening of disc recording time. Besides, since a position inside of the TOC area is outside of a normal recording area, recording of the intermediate information in this area will in no way affect normal reproduction adversely.

Position information necessary for generating TOC information is obtained directly by the position information generation means or, alternatively, may be obtained from program information to be recorded after imparting of position information thereto. The storage of information in the memory means may be made in various manners. For example, position information obtained may be stored directly and processed into a predetermined TOC information format after being read from the memory. Alternatively, the position information obtained may be processed into a predetermined TOC information format previously and stored in the memory and then information read from the memory may be recorded directly on the disc. Recording of intermediate information during interruption of recording may be made by using a predetermined TOC information format or may be made by employing other methods.

A preferred embodiment of the invention will now be described with reference to the accompanying drawings.

BRIEF DESCRIPTION OF THE DRAWINGS

In the accompanying drawings.

DESCRIPTION OF A PREFERRED EMBODIMENT

A preferred embodiment of the invention will now be described. In this embodiment, recording of information is made in a CD format on an additional writing type optical disc of a CD standard and a disc corresponding to a CD, CD-ROM, CD-I or CDV is produced.

Figure 2:
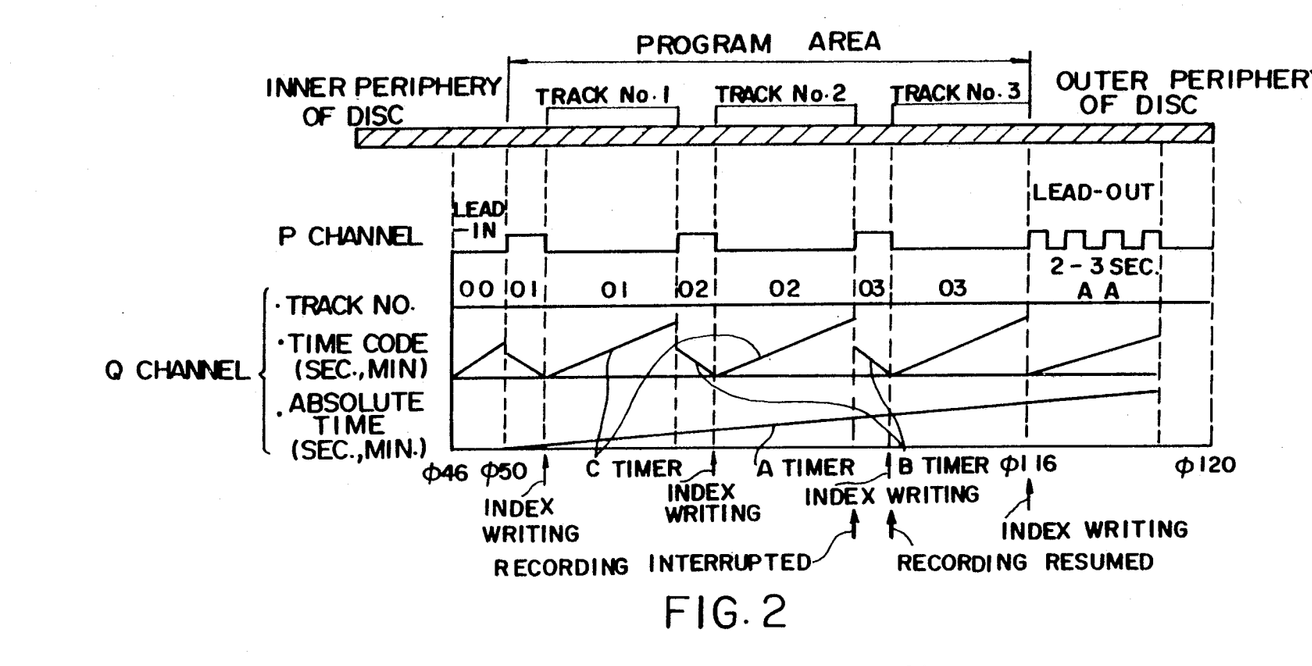
FIG. 2 is a diagram showing a state of respective areas in a CD standard disc and subcode signals in P and Q channels.

The standard of a CD is shown in FIG. 2. A CD has an outside diameter of 120 mm and has a lead-in area which starts from a diameter of about 46 mm from the center, a program area ranging from a diameter of about 50 mm to a diameter of about 116 mm and a lead-out area of a width of 0.5 mm or over adjacent the end periphery of the program area. The lead-in area is utilized as a TOC area where TOC information of the disc is recorded. Program information is recorded in the program area. In the lead-out area is recorded a signal indicating the end of the program. In the respective areas are recorded, as shown in FIG. 2, track numbers (i.e., program numbers such as music numbers), time code (time of each program) and absolute time.

Figure 3:
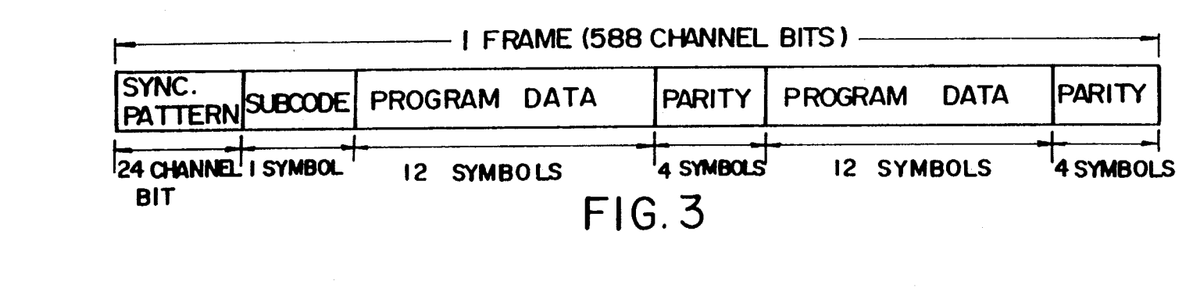
FIG. 3 is a diagram showing construction of one frame of the CD standard.
Figure 4:
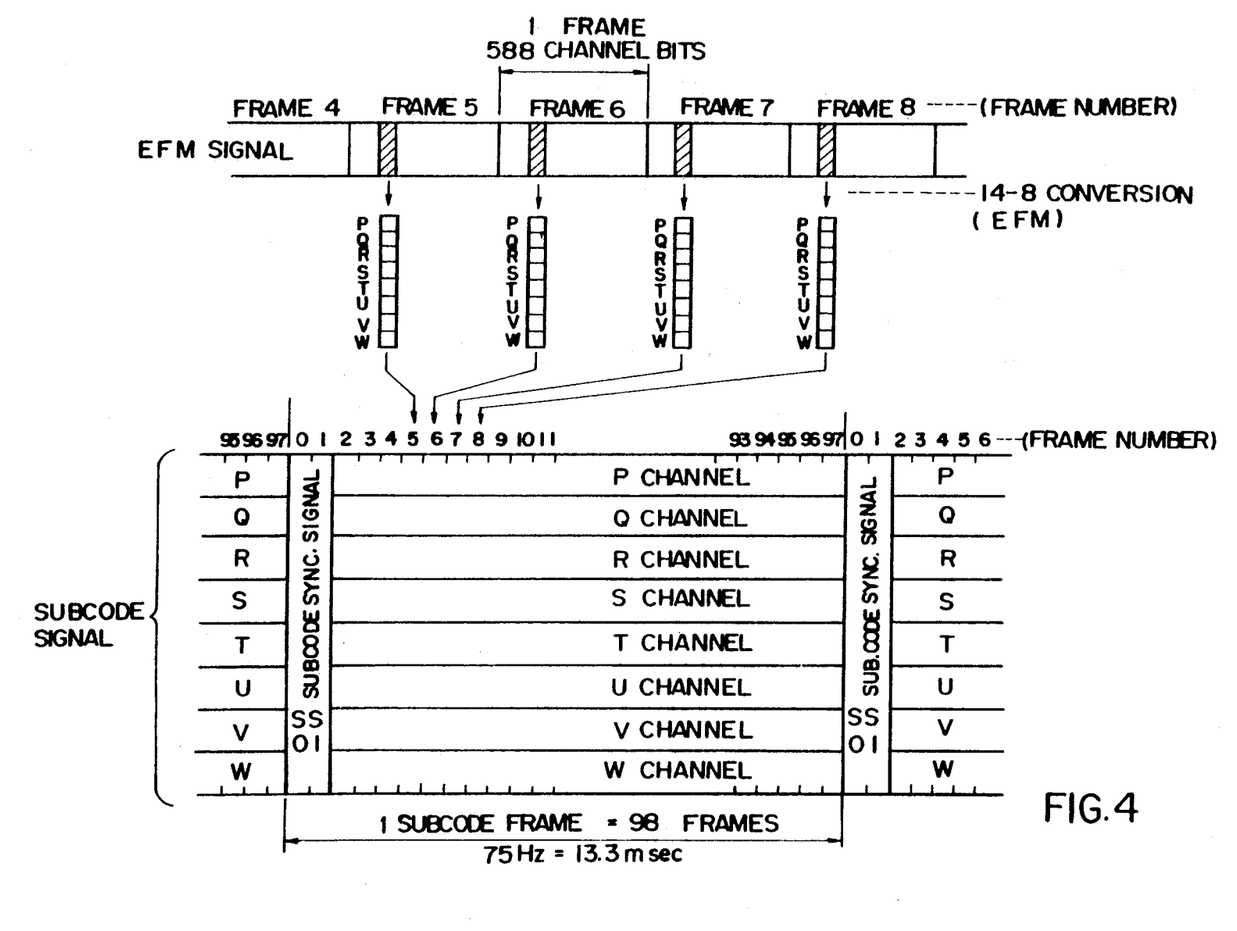
FIG. 4 is a diagram showing construction of a subcode signal of the CD standard.
Figure 5:
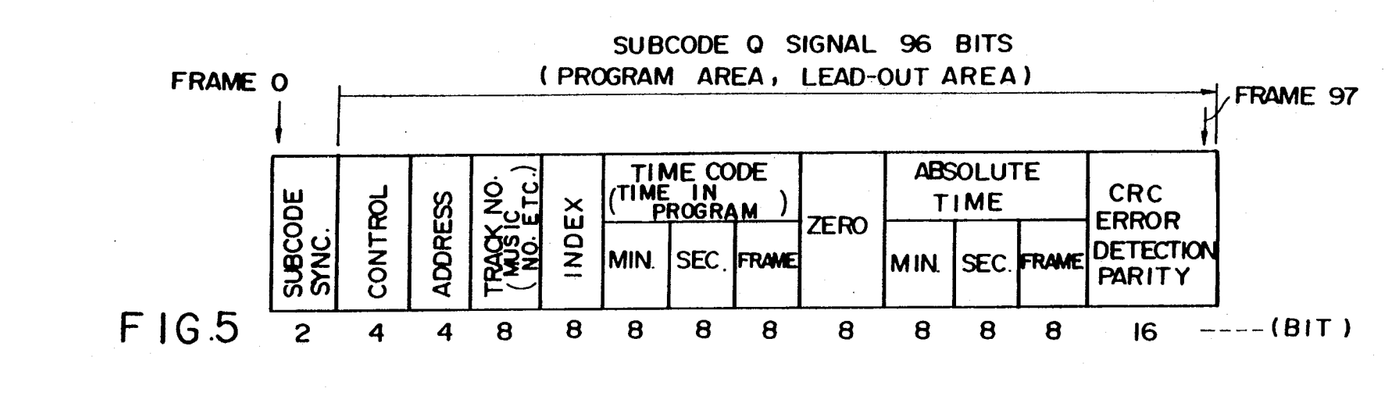
FIG. 5 is a diagram showing a format of a Q channel subcode signal of the CD standard (program area and lead-out area)

One frame of recorded information consists of 588 channel bits. The construction of one frame in the program area is shown in FIG. 3. In the program area, a subcode as well as program data (e.g., music data) are recorded. As shown in FIG. 4, one subcode frame of each subcode consists of 98 frames. In the subcode, P channel distinguishes a period during which music is performed from an interval between such periods. As shown in FIG. 2, the P channel becomes "1" during the interval of music and "0" during the music performance period. In the lead-out area, the P channel repeats "1" and "0" for a few seconds. In the program area and lead-out area of the Q channel, as shown in FIG. 5, the track number, time code and absolute time are recorded as position information. As shown in FIG. 2, the track number is designated by 00 in the lead-in area and 01, 02, 03, . . . in the program area in the order of the program. The time code increases from zero in each program and in each of the lead-in and lead-out areas and decreases to zero at the interval of music performance. The absolute time increases gradually from zero from start of the track number 01 to the end of the lead-out area.

Figure 6:
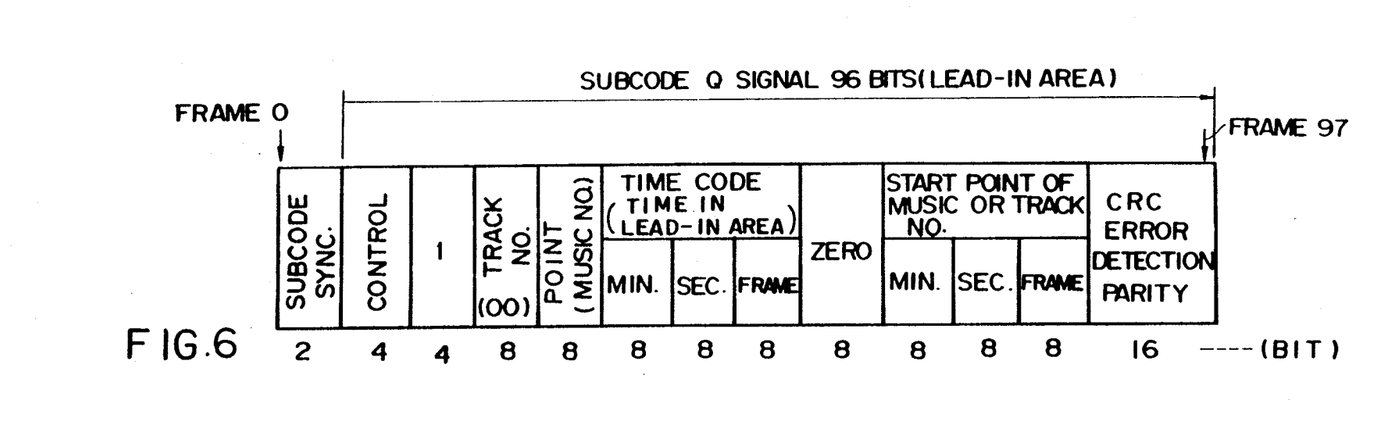
FIG. 6 is a diagram showing a format of a Q channel subcode signal of the CD standard (lead-in area)

The Q channel subcode in the lead-in area is shown in FIG. 6. The lead-in area is indicated by the track number 00. In the lead-in area, in addition to the time code which represents duration of time in the lead-in area, information including each music number, a start point of each music number, total number of music pieces and time required for finishing all music pieces is repeatedly recorded as TOC information in the program area.

Figure 7:
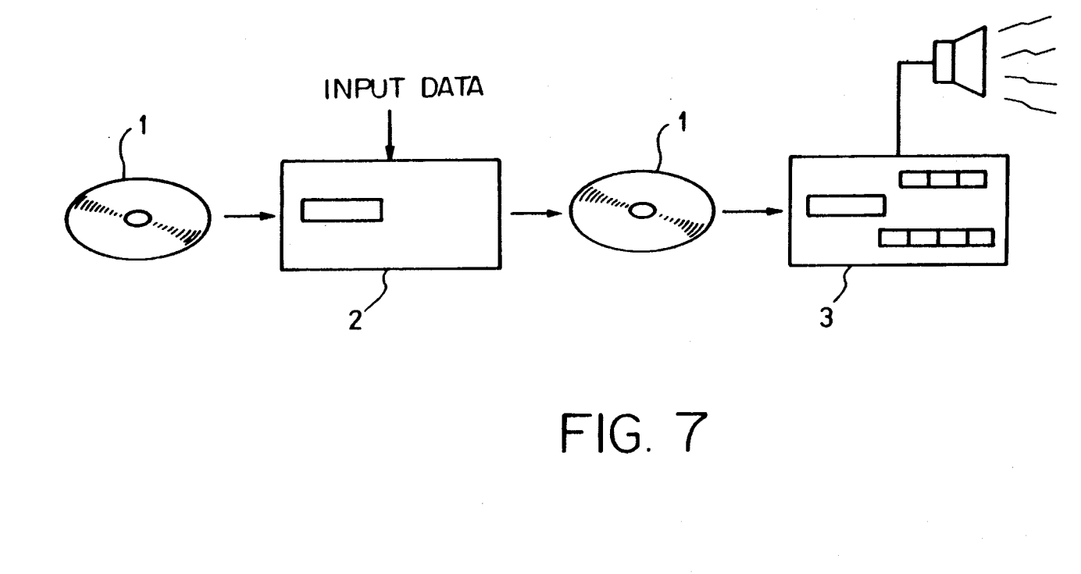
FIG. 7 is a block diagram showing the entire construction of a disc recording and reproducing system to which the present invention is applied.

An example of construction of the entire system of an optical disc recording and reproducing system to which the present invention is applied and which records and reproduces information on a disc of the CD standard by means of a recording and reproducing system of the CD standard is shown in FIG. 7.

An optical disc 1 has a recording surface made of a material on which information can be recorded with a semiconductor laser device and which has a relatively high light reflectivity. The optical disc 1 is so made that its mechanical size matches the standard size of an optical disc of the CD standard (e.g., CD, CD-ROM, CD-I of CDV) which is played back by a playback device 3.

A recording device 2 is a device to which the present invention has been applied. The recording device 2 is operated in such a manner that an input signal to be recorded is provided at a predetermined transfer speed in the form of a data signal of a mark length recording system which matches a CD standard format of a CD played back by the playback device 3, the optical disc 1 is driven at a linear velocity of the CD standard, positions of the optical disc 1 and the semiconductor laser are controlled by a pregroove which is preformed in the optical disc 1 so as to match a track pitch of the CD standard and irradiation state of the semi-conductor laser is controlled in response to the data signal so as to break the recording surface of the optical disc 1 to form a pit and thereby effect recording on the optical disc 1.

The optical disc 1 on which recording has been made by the recording device 2 is played back by using the playback device 3 of a CD, CD-ROM, CD-I or CDV which matches it.

The recording device 2 and the playback device 3 may be integrated together to form a device performing recording and playback with a single device.

A specific example of the system of FIG. 7 will now be described.

Specifications of the optical disc 1 are determined as shown in the following Table 1:

TABLE 1

| | |
|---|---|
| Reflectivity of the mirror section (plain) | 59%-75% |
| Outside diameter of the disc | 120 mm |
| Mechanical size | The same as CD standard |
| Depth of the pregroove | 20-50 nm |
| Width of the pregroove | 0.3 μm-1.3 μm |
| Recording site | Pregroove |
| Signal format | The same as CD standard |
| Linear velocity | 1.2-1.4 m/s |
| Reflectivity of the recording section | 35% and over |

Figure 8A:
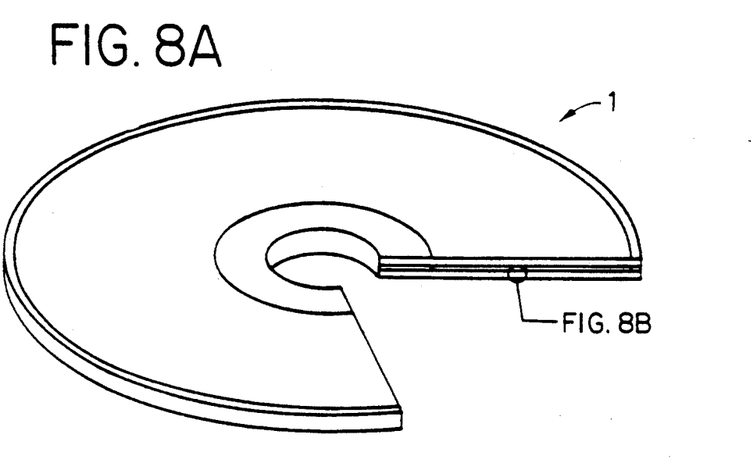
FIG. 8 is a diagram showing an example of construction of a writable type disc 1 of FIG. 1.
Figure 8B:
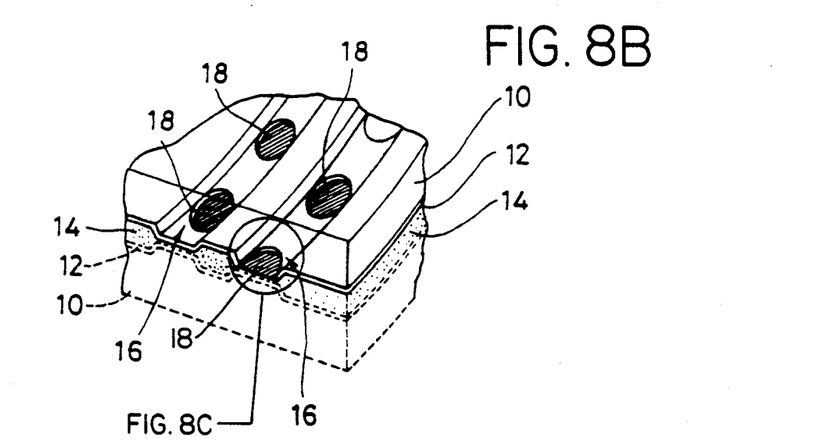
Figure 8C:
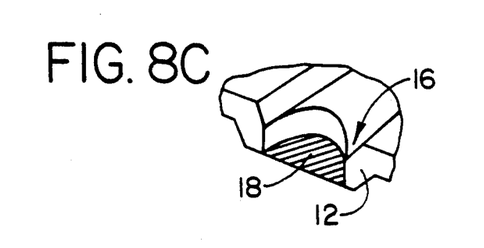

FIG. 8 shows an example of recording medium.

The optical disc 1 is made by forming a film 12 of a thickness of several tens nm consisting of an alloy of e.g., In, Bi or Sn (e.g., In-Ge alloy) or a TeC system alloy on the surface of a transparent disc substrate 10 made of polycarbonate or acrylic resin and is used as a single sheet of plate.

The substrate 10 and the film 12 are formed with a pregroove (guide groove) 16 and a portion of the film 12 above this pregroove 16 is burnt with laser beam to form a pit. This pit constitutes a pit 18 for recording information. The depth of the pregroove 16 is set at 20-50 nm and width thereof is set at 0.3-1.3 μm.

For recording the pit 18 above the pregroove 16, either of the three-beam method and the push-pull method can be used as a tracking error detection method. For recording the pit 18 on a land 17, the three-beam method is used.

If the film 12 on the surface of the disc substrate 10 is formed with an alloy of e.g., In, Bi or Sn (e.g., In-Ge alloy) or a TeC system alloy, the reflectivity of the mirror section (plain) can be increased to 59-75% whereby the optical disc can be played back in a conventional CD player.

Figure 1:
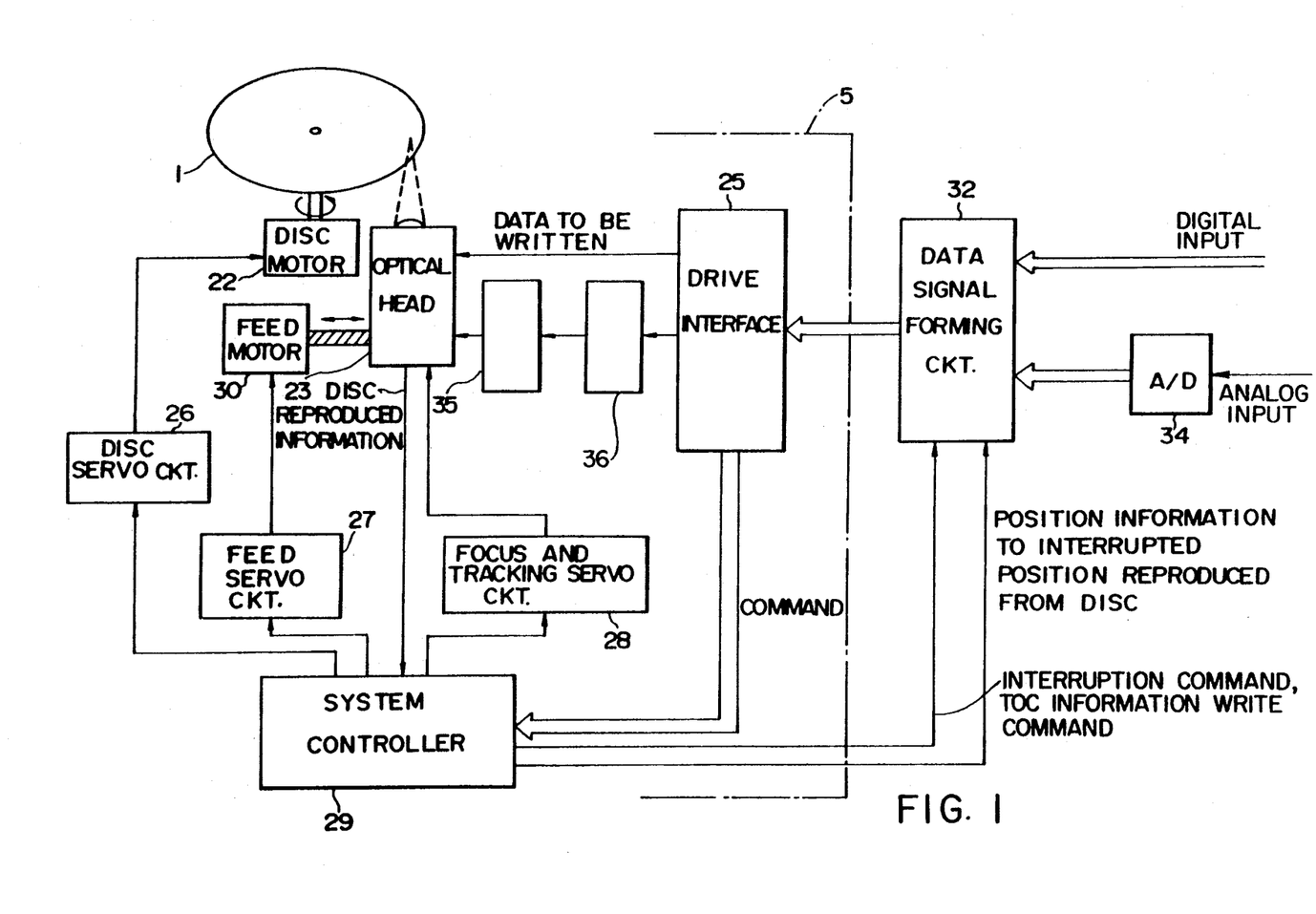
FIG. 1 is a block diagram showing an embodiment of the invention which is a specific example of a recording device 2 of FIG. 7.

A specific example of the recording device 2 of FIG. 7 is shown in FIG. 1.

A disc servo circuit 26 controls a disc motor 22 at a constant linear velocity in accordance with a command from a system controller 29. This constant linear velocity control is made by an arithmetic operation control based on position of an optical head 23.

A focus servo and tracking servo circuit 28 controls, in accordance with a command from a system controller 29, focusing and tracking of laser beam irradiated by a semiconductor laser in the optical head 23. The tracking control is performed by detecting a pregroove formed in the disc 1. A feed servo circuit 27 drives a feed motor 30 in accordance with a command from the system controller 29 to displace the optical head 23 in the radial direction of the disc 1.

If an input signal to be recorded on the optical disc 1 is a digital signal, it is applied directly to a data signal forming circuit 32 whereas if the input signal is an analog signal, it is applied to the data signal forming circuit 32 through an analog-to-digital converter 34. The sampling frequency and data bit number of the input data are adapted to match CD data. The data signal forming circuit 32 applies interleave to the input data and imparts an error check code to form a subcode and EFM-modulates it to form and outputs a series of serial data with a format and transfer rate adapted to a CD. The data signal forming circuit 32 also generates and outputs TOC information by applying the present invention in the manner to be described later.

Output data of the data signal forming circuit 32 is applied to a data signal correction circuit 36 through a drive interface 25. That data signal correction circuit 36 corrects a data signal in accordance with a length corresponding to its pit and a length corresponding to an immediate blank before the pit. In other words, the data signal correction circuit 36 decreases differences between a data signal timing and positions of a recorded pit and blank caused by heat accumulation due to laser beam irradiated on the recording surface of the optical disc 1 by increasing or decreasing the data signal timing and prevents increase in the width of the recorded pit by splitting the data signal timing. More specifically, as to increasing or decreasing of the data signal timing, irradiation time of laser beam is shortened if it is desired to form a pit whose immediately preceding blank length is short whereas start of irradiation of laser beam is quickened if it is desired to form a pit whose immediately preceding blank length is long. As to splitting of the data signal timing, the number of splitting and pulse width and pulse intensity of each split laser beam pulse are determined. This data signal correction is described in detail in European Patent Application Publication No. 0317193.

Output data of the data signal correction circuit 36 is applied to a laser generation circuit 35. the laser generation circuit 35 drives the semiconductor laser in the optical head 23 in response to the data signal to irradiate laser beam on the recording surface of the optical disc 1 for recording of data. In this manner, data is recorded on the optical disc 1 with a format, transfer speed and linear velocity (1.2-1.4 m/s) matching the CD standard.

Figure 9:
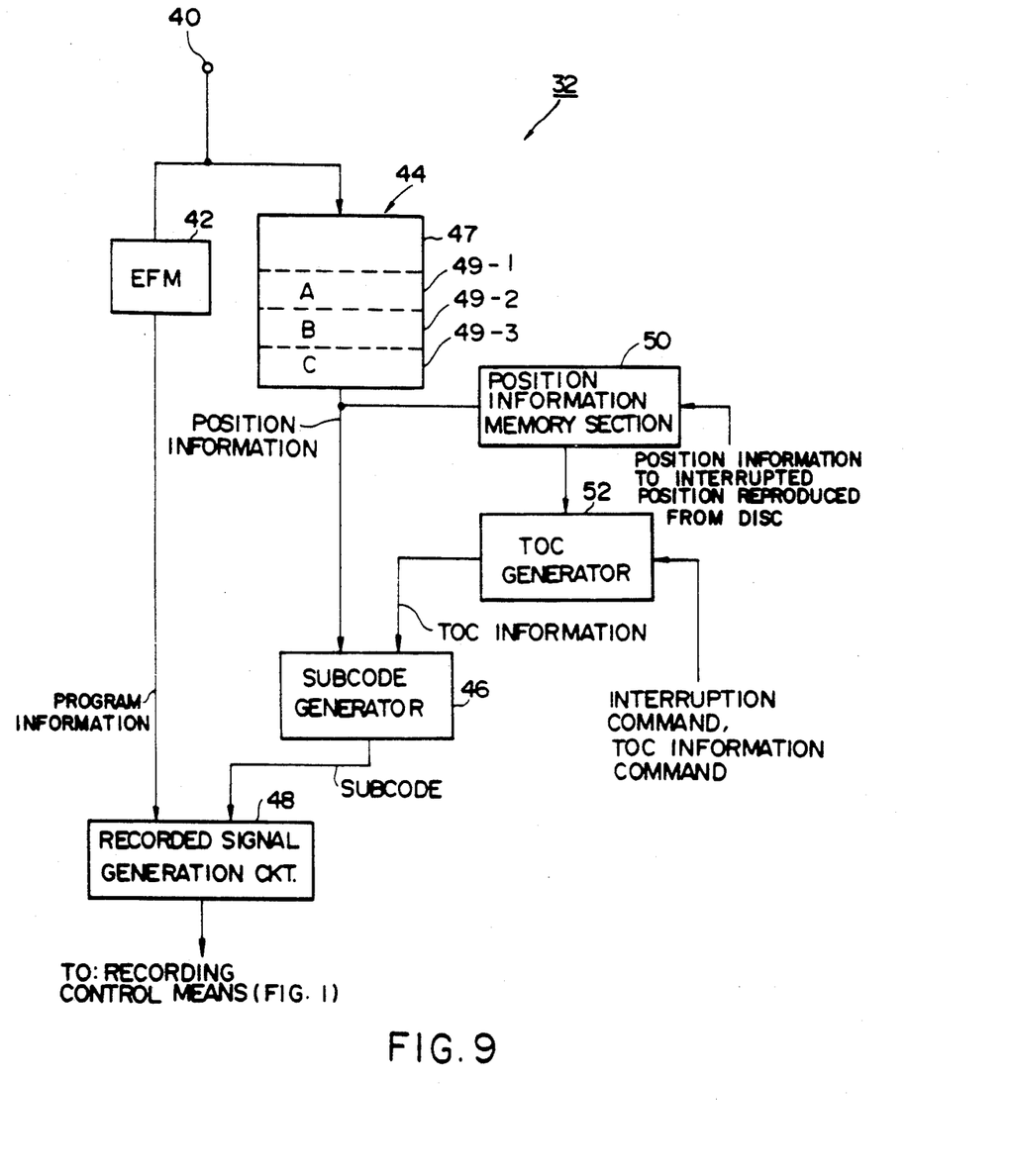
FIG. 9 is a diagram showing an example of a data signal forming circuit 32 in FIG. 1.

A specific example of the data signal forming circuit 32 of FIG. 1 is shown in FIG. 9.

Program information to be recorded in the program area of the optical disc 1 which has been subjected to pulse code modulation is applied to an input terminal 40 which constitutes input means with a predetermined interval between music pieces (about four to five seconds). The input program information is applied, on one hand, to an EFM circuit 42 and, on the other hand, to a position information generation circuit 44 which constitutes position information generation means. The EFM circuit 42 applies EFM to the input program information. The position information generation circuit 44 detects a starting point of each program information in an index generator 47 to form an index signal (see FIG. 2) and thereupon drives an A timer 49-1 and a C timer 49-3. The position information generation circuit 44 detects also an end point of each program information and thereupon drives a B timer 49-2 to generate position information to be recorded in the Q channel (see FIG. 2). The A timer 49-1 generates absolute time information from the starting point of the program information.

The C timer 49-3 generates a time code of each music piece (i.e., time information increasing from zero). The B timer 49-2 generates a time code of interval between music pieces (i.e., time information of certain duration of time decreasing to zero).

A subcode generator 46 generates the above described Q channel subcode signal of FIG. 5 and subcode signals of other channels successively in response to momentarily changing respective position information. A recorded signal generation circuit 48 generates and outputs a series of program information by combining the EFM modulated program information, subcode information, synchronizing signal and parity check code in the manner shown in FIG. 3. The output program information is successively recorded in the program area on the optical disc 1 by the recording control means 5 of FIG. 1.

A position information memory section 50 which constitutes memory means receives and stores position information necessary for generating TOC information on the basis of position information generated by the position information generation circuit 44. This position information includes, e.g., the number of each program, start time of each program (i.e., the absolute time by the A timer 49-1), the number of all programs and the absolute time of finishing of all programs.

A TOC generator 52 which constitutes TOC information output means generates, after ending of recording of all program information, TOC information on the basis of position information stored in the position information memory section 50. The TOC information generated by the TOC generator 52 is repeatedly generated after being formed into the format shown in FIG. 6 by the subcode generator 46 and successively recorded in the TOC area starting from the diameter of 46 mm by the recording control means 5 of FIG. 1. through the recorded signal generation circuit 48. In a case where program information is recorded program by program separately with interruption, position information (intermediate information) stored in the position information memory section 50 is read out at each time point when recording is interrupted by, e.g., operation of an operator. This intermediate information is formed into a predetermined format by the subcode generator 46 and thereafter is written at a position inside of the lead-in area of the optical disc 1 by the recording control means 5 of FIG. 1 which functions as intermediate information recording control means through the recorded signal forming circuit 48 (the transfer mechanism of the optical head 23 must of course be so constructed that the optical head 23 can be transferred to a point inside of the lead-in area of the optical disc 1). Thus, the intermediate information is once recorded in the optical disc 1. The intermediate information to be written in this case is information necessary for generation of TOC information, i.e., the music number, start point of each music piece etc. which have been written by the time point of interruption of the program.

When recording is to be resumed, the optical head 23 is transferred to a position inside of the lead-in area by a command from the system controller 2 which acts as intermediate information memory control means to read the newest intermediate information recorded therein and store it in the position information memory section 50.

If the interruption of recording is made several times, intermediate information is recorded at positions inside of the lead-in area by the same number of times so that the area where intermediate information is to be recorded must be provided with sufficient space. For this purpose, intermediate information at the first interruption, for example, is recorded at a position which is N tracks inside of the start point of the lead-in area and intermediate information at subsequent interruptions are recorded at positions nearer the lead-in area. According to this method, when recording has been interrupted, the optical head 23 is positioned at a position inside of the start point of the lead-in area by N tracks and reproduction of the optical disc 1 is made until the end point of recording position of last intermediate information is detected and then new intermediate information can be written. In resuming recording of program information, the optical head 23 is positioned at a position inside of the start point of the lead-in area by N tracks, intermediate information which is obtained last in reproducing the optical disc 1 is read by the position information memory section 50 and last recording position of program information is detected on the basis of this intermediate information whereby new program information can be recorded. According to this method, in case the number of times of interruption is large, the recording position of intermediate information is likely to enter the lead-in area so that it is necessary to set the track numbe N with sufficient allowance.

As another method for recording intermediate information on the optical disc 1, it is also conceivable to record intermediate information from the start point of the lead-in area inwardly in the order of older information. According to this method, there is no danger of entering or recording of intermediate information in the lead-in area however frequently interruption may occur but, when new intermediate information is to be recorded, the start point of intermediate information recorded last must be detected and recording must be made outwardly starting from a position inside thereof by a predetermined distance (i.e., distance necessary for recording new intermediate information) and therefore this involves difficulty in finding out a position at which recording should be started. It is also difficult to find out how far inside of the lead-in area the last recorded intermediate information is located.

As still another method for recording intermediate information on the optical disc 1, it is also conceivable to record intermediate information from the start point of the lead-in area inwardly by rotating the optical disc 1 reversely. According to this method, there is no danger of entering of recording of intermediate information in the lead-in area however frequently interruption may occur and, besides, it suffices to detect the end point of recording of last intermediate information and record new intermediate information from this position so that it is easy to find out a position at which recording should be started. In case last recorded intermediate information is read out, the disc may be rotated reversely to read it out inwardly from the start point of the lead-in area and intermediate information obtained last may be used as the newest intermediate information.

The newest intermediate information which has been read out from a position inside of the lead-in area of the optical disc 1 at resumption of recording of program information is stored in the position information memory section 50. Upon completion of reading of the newest intermediate information, the recording control means 5 positions the optical head 23 at a position at which recording of program information should be resumed in response, for example, to this intermediate information to read a last value of the A timer 49-1 before interruption which is recorded in an interval section immediately before the record resumption position and set this value in the A timer 49-1. The recording control means thus causes the A timer 49-1 to resume counting with the C timer 49-3 which resumes counting from zero to input program information and effect recording on the optical disc 1.

As a method for finding out, at resumption of recording, the newest intermediate information from among plural intermediate information, it is conceivable to find out intermediate information whose value in the A timer 49-1 is the largest or utilize last read out intermediate information. As a method for positioning the optical head 23 at a position in the program area at which recording of information should be resumed, it is conceivable, for example, to detect a position in the program area which is designated by the value of the A timer 49-1 in read out intermediate information or detect a boundary between a signal portion and a non-signal portion in the program area.

By performing the above described writing of intermediate information at each interruption of recording of program information, program information can be recorded program by program separately and with interruption. Upon completion of recording of last program information to be recorded on the optical disc 1, lead-out information is successively recorded. By completion of recording of all program information, program numbers and start points of all programs necessary for producing TOC information are stored in the position information memory section 50. Accordingly, responsive to a TOC information write command given by the system controller 29 in accordance with an operation such as a program information recording finish order operation made by an operator, position information is read from the position information memory section 50 and thus TOC information is generated by the TOC generator 46. The TOC information is repeatedly produced after being formed into the format of FIG. 6 by the subcode generator 46 and is recorded from the diameter of 46 mm in the TOC area of the optical disc 1 by the recording control means 5 of FIG. 1 through the recorded signal generation circuit 48. Upon detection of overwriting of TOC information over first position of program information at the position of diameter of 50 mm, writing of TOC information is finished.

Description will now be made about a series of recorded signal forming operation by the data signal forming circuit 32 of FIG. 1. By way of example, description will be made about a case where, as shown in FIG. 2, interruption has been made upon recording Track No. 2 and Track No. 3 is recorded later on.

Each program information which has been pulse code modulated is applied sequentially from the input terminal 40 with a predetermined interval between each program and EFM-modulated by the EFM circuit 42. In the position information generation circuit 44, the index generator 47 detects the starting point of each program and generates an index signal. At a timing of the index signal, the P channel subcode becomes "0". At a timing of starting of the program area, the A timer 49-1 is driven in increasing direction from zero to generate absolute time information and, at a timing of each index signal, the C timer 49-3 is driven in increasing direction from zero to generate time information in each program. The C timer 49-3 stops driving upon completion of each program and starts driving in increasing direction from zero at a next index signal. At a timing of finishing of each program, the B timer 49-2 is driven in decreasing direction from a predetermined time (time corresponding to a set interval time) so that it becomes zero at a timing of starting of a next program (see FIG. 2).

Time information generated in this manner is formed into the format of FIG. 5 by the subcode generator 46 and combined with program information by the recorded signal generation circuit 48 to form a series of data shown in FIG. 3. This series of data is recorded sequentially in the program area on the optical disc 1 by the recording control means 5 of FIG. 1.

In parallel to this recording, the position information memory section 50 obtains information including the number of each program, start time (absolute time), total program number, absolute time for completing all programs from the position information generation circuit 44 and stores this information as position information necessary for generating TOC information.

Upon completion of recording up to Track No. 2, an interruption command is given by the system controller 29 in accordance with an operation such as an interruption operation by an operator. The position information up to this time point stored in the position information memory section 50 is read out as intermediate information and is recorded at a position inside of the lead-in area by transferring of the optical head 23. During this interruption period, reproduction of program information which has already been recorded is possible.

In case recording is made in Track No. 3, the optical head 23 is transferred further inside of the lead-in area and the newest intermediate position information is read out and stored in the position information memory section 50. The end portion of recorded information in the program area is detected and Track No. 3 is recorded after recording an interval section. Upon completion of recording of Track No. 3, a TOC information write command is given in accordance with an operation such as a program information recording finish order operation by an operator to record lead-out information. Thereafter, recording of TOC information is made in the lead-in area. If the TOC information write command is not given (i.e., in case there is possibility of recording program information further), the optical head 23 returns to a position inside of the lead-in area to record new intermediate information so that this new intermediate information will not overlap the preceding intermediate information thereby maintaining the interrupted state. When an all program write finish command has been given thereafter, last intermediate information is read from the position inside of the lead-in area and stored in the position information memory section 50. The optical head 23 records lead-out information and then returns to the lead-in area to record TOC information.

In the above described embodiment, description has been made about a case where recording is made by the CD standard. The present invention however is applicable to cases where recording is made by other standards.

In the above described embodiment, the invention has been applied to an additional writing type disc. The invention however is applicable also to an erasable type disc.

In the above described embodiment, TOC information is recorded in a forward direction from a position of diameter of 46 mm. It is however difficult in this method to synchronize TOC information accurately with program information with a result that, during a reproduction mode, the disc rotation servo may be disturbed during reproduction of information. Therefore, by detecting synchronization of start portion of program information by rotating the optical disc reversely after completion of writing of program information and supplying a record signal of TOC information in a reverse direction in such a manner that the timing of TOC information agrees with the detected synchronization so as to write TOC information in the TOC area in a reverse direction, synchronization in the vicinity of the start position of the program area can be detected and TOC information can therefore be written successively and program information can be synchronized with TOC information readily whereby the disc rotation servo can be stabilized.

What is claimed is:

1. An optical disc recording system comprising:
   input program information means for inputting program information to be recorded;
   position information generation means for generating position information in parallel to inputting the program information;
   program information output means for delivering output program information after imparting the generated position information to the input program information means;
   program information recording control means for recording the output program information in a program area on an optical disc;
   memory means for obtaining and storing, during recording of the program information, position information necessary for generating table-of-contents information on the basis of the generated position information;
   intermediate information recording control means for reading out position information, i.e., intermediate information, stored in said memory means during interruption of recording of the program information and recording the intermediate information at a position inside from a table-of-contents area on the optical disc, the table-of-contents area having a start point and an innermost point;
   intermediate information memory control means for reading out, at resumption of recording of program information, the intermediate information recorded on the disc and storing it in said memory means;
   table-of-contents information output means for reading out the information stored in said memory means and providing this information as table-of-contents information; and
   table-of-contents recording control means for recording the output table-of-contents information in the table-of-contents area on the disc.

2. An optical disc recording system as defined in claim 1 wherein said intermediate information recording control means records intermediate information at the first interruption at a position which is N track (where N being any integer) inside from the start point of the table-of-contents area and intermediate information at subsequent interruptions at positions nearer the table-of-contents area.

3. An optical disc recording system as defined in claim 1 wherein said intermediate information recording control means records intermediate information from the start point of the table-of-contents area inwardly in the order of older information.

4. An optical disc recording system comprising: input program information means for inputting program information to be recorded;
   position information generation means for generating position information in parallel to inputting the program information;
   program information output means for delivering output program information after imparting the generated position information to the input program information means;
   program information recording control means for recording the output program information in a program area on an optical disc;
   memory means for obtaining and storing, during recording of the program information, position information necessary for generating table-of-contents information on the basis of the generated position information;
   intermediate information recording control means for reading out position information, i.e., intermediate information, stored in said memory means during interruption of recording of the program information and recording the intermediate information at a position inside from a table-of-contents area on the optical disc, the table-of-contents area having a start point and an innermost point;
   intermediate information memory control means for reading out, at resumption of recording of program information, the intermediate information recorded on the disc and storing it in said memory means;
   table-of-contents information output means for reading out the information stored in said memory means and providing this information as table-of-contents information; and
   table-of-contents recording control means for recording the output table-of-contents information in the table-of-contents area on the disc,
   wherein said intermediate information recording control means records information from the start point of the table-of-contents area inwardly by rotating the optical disc reversely.

5. An optical disc recording sysem as defined in claim 1 wherein said table-of-contents recording control means records the table-of-contents information in a forward direction from the innermost point of the table-of-contents area.

6. An optical disc recording system comprising:
   input program information means for inputting program information to be recorded;
   position information generation means for generating position information in parallel to inputting the program information;
   program information output means for delivering output program information after imparting the generated position information to the input program information means;
   program information recording control means for recording the output program information in a program area on an optical disc;
   memory means for obtaining and storing, during recording of the program information, position information necessary for generating table-of-contents information on the basis of the generated position information;
   intermediate information recording control means for reading out position information, i.e., intermediate information, stored in said memory means during interruption of recording of the program information and recording the intermediate information at a position inside from a table-of-contents area on the optical disc, the table-of-contents area having a start point and an innermost point;

intermediate information memory control means for reading out, at resumption of recording of program information, the intermediate information recorded on the disc and storing it in said memory means;

table-of-contents information output means for reading out the information stored in said memory means and providing this information as table-of-contents information; and table-of-contents recording control means for recording the output table-of-contents information in the table-of-contents area on the disc, wherein said table-of-contents recording control means records the table-of-contents information by rotating the optical disc reversely after completion of writing of program information for detecting synchronization of a start portion of program information and supplying a record signal of table-of-contents information in a reverse direction in such a manner that the timing of the table-of-contents information agrees with the detected synchronization.

7. An optical disc recording system as defined in claim 1 wherein said position information generation means comprises index signal generation means for generating an index signal indicating a start point of each program, first timer means for generating absolute time information indicating duration of time required for finishing all programs from the start point of program information, second timer means for generating a time code indicating duration of the time for each program and third timer means for generating a time code indicating an interval between programs.

8. An optical disc recording system as defined in claim 1 wherein said optical disc is one of a CD standard.

* * * * *